(12) United States Patent
Gorinevsky et al.

(10) Patent No.: US 7,012,271 B2
(45) Date of Patent: Mar. 14, 2006

(54) ELECTROMAGNETIC RADIATION STRUCTURE CONTROL SYSTEM

(75) Inventors: Dimitry Gorinevsky, Palo Alto, CA (US); Tristram T. Hyde, Severna Park, MD (US); Lawrence P. Davis, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 215 days.

(21) Appl. No.: 10/401,651

(22) Filed: Mar. 28, 2003

(65) Prior Publication Data

US 2004/0021098 A1  Feb. 5, 2004

Related U.S. Application Data

(60) Provisional application No. 60/368,500, filed on Mar. 28, 2002.

(51) Int. Cl.
*G01V 8/00* (2006.01)

(52) U.S. Cl. .............................. 250/559.22; 250/201.9; 250/559.29; 356/601; 356/512

(58) Field of Classification Search ............. 250/201.1, 250/201.9, 559.19, 559.22, 559.29; 359/224, 359/846, 849; 356/601, 612, 512, 513
See application file for complete search history.

(56) References Cited

U.S. PATENT DOCUMENTS

| | | | |
|---|---|---|---|
| 4,725,144 A | | 2/1988 | Nelson et al. |
| 4,816,759 A | | 3/1989 | Ames et al. |
| 4,825,062 A | | 4/1989 | Rather et al. |
| 5,109,349 A | | 4/1992 | Ulich et al. |
| 5,220,406 A | | 6/1993 | Kishner |
| 5,265,034 A | * | 11/1993 | Breckenridge et al. .. 250/201.1 |
| 6,163,381 A | * | 12/2000 | Davies et al. ................ 356/521 |
| 6,201,230 B1 | * | 3/2001 | Crowther et al. ......... 250/203.6 |
| 6,278,100 B1 | * | 8/2001 | Friedman et al. ......... 250/201.9 |
| 6,486,831 B1 | * | 11/2002 | Martorana et al. .......... 342/458 |
| 6,513,939 B1 | * | 2/2003 | Fettig et al. ................. 359/847 |
| 6,738,199 B1 | * | 5/2004 | Nishioka ..................... 359/726 |
| 6,784,408 B1 | * | 8/2004 | Cheung et al. ........... 250/201.9 |
| 2003/0147162 A1 | * | 8/2003 | Bennett et al. ............. 359/849 |
| 2004/0150871 A1 | * | 8/2004 | Yang .......................... 359/291 |

FOREIGN PATENT DOCUMENTS

| | | |
|---|---|---|
| EP | 0 546 811 A1 | 6/1993 |
| EP | 0 769 712 A1 | 4/1997 |
| EP | 0 802 438 A2 | 10/1997 |

* cited by examiner

*Primary Examiner*—David Porta
*Assistant Examiner*—Davienne Monbleau
(74) *Attorney, Agent, or Firm*—Kurt A. Luther (57) ABSTRACT

A control system is provided for controlling the shape of a flexible electromagnetic radiation structure. The control system includes a plurality of actuators and a plurality of computational elements. Each of the plurality of actuators is coupled to a portion of the radiation structure and can be selectively actuated by the plurality of computational elements. Thus, the plurality of actuators and the plurality of computational elements provide control of the flexible electromagnetic radiation structure shape. In one embodiment, each of the plurality of computational elements controls one section of the flexible electromagnetic radiation structure. Thus each of the plurality of computational elements receives controls the one or more of the plurality of actuator within its section. Together, the plurality of computational elements provide a distributed control network for the radiation structure. The control system thus provides the ability to accurately control and shape a flexible electromagnetic radiation structure.

24 Claims, 7 Drawing Sheets

ELECTROMAGNETIC RADIATION STRUCTURE CONTROL SYSTEM

CROSS REFERENCE TO RELATED APPLICATIONS

This application claims the benefit of U.S. Provisional Patent Application No. 60/368,500, filed Mar. 28, 2002.

FIELD OF THE INVENTION

The present invention generally relates to an electromagnetic radiation structure, and more particularly to methods and apparatus for measuring and controlling the surface figure of a flexible electromagnetic radiation structure.

BACKGROUND OF THE INVENTION

Electromagnetic radiation structures have numerous applications. These applications include, but are not limited to reflecting, collecting, receiving, and/or emitting radiation within the electromagnetic spectrum (e.g., Radio Frequency (RF), Ultra-Violet (UV), visible, and Infrared (IR) radiation). The electromagnetic radiation is reflected, collected, received, and/or emitted by electromagnetic radiation structures for numerous purposes, including, but not limited to, terrestrial science, surveillance, and exploration, space science, surveillance, and exploration, and terrestrial and/or space-based communication. Electromagnetic radiation structures have continued to evolve and improve to meet past, present and future requirements to accomplish the foregoing purposes and other purposes not specifically mentioned but known to those of ordinary skilled in the art.

Generally, electromagnetic radiation structures have been configured to utilize rigid structures. For example, a rigid structure is described in United States (U.S.) Pat. No. 5,109,349, U.S. Pat. No. 4,825,062, and U.S. Pat. No. 4,816,759, which are hereby incorporated by reference. More specifically, the rigid structure described in U.S. Pat. No. 5,109,349, U.S. Pat. No. 4,825,062, and U.S. Pat. No. 4,816,759, employs mirror segments that rigid and individually controllable with three linear actuators that adjust with respect to a rigid rear surface (i.e., each of the mirror segments are tilted with respect to the rigid rear surface). Each of the mirror segments has a sensor for measuring the positioning of the mirror segment with respect to the rigid rear surface (i.e., measuring the tilt of the mirror segment with respect to the rigid rear surface), and each of the mirror segments is individually controllable using tilt error data obtained from a sensor of each mirror segment and sensors of neighboring mirror segments. While this structure provides an accurate surface figure, there are attributes and characteristics introduced by the rigidity that are less than desirable and limiting.

For example, the rigid structure described in U.S. Pat. No. 5,109,349, U.S. Pat. No. 4,825,062, and U.S. Pat. No. 4,816,759, requires the rigid rear surface for positioning of the mirror segments. Therefore, this configuration is generally not applicable to flexible materials (e.g., light weight truss beams, membranes or films that are inherently non-rigid) that can be used to form electromagnetic radiation structures. In addition, tilt control of each mirror segment using tilt error data for a mirror segment and tilt error data for neighboring mirror segments as described in the foregoing patents assumes that the surface of the electromagnetic radiation structure is divided into separate and distinct segments, which are separately controllable and generally isolated from other segments. However, as flexible materials are generally unitary without distinct segments, positioning or movement of one portion of the flexible and lightweight film is likely to cause surface deformation that propagates to other portions of the material, and the prior art methods and apparatus for controlling the surface figure of the material are generally inadequate and will not provide the desirable accuracy.

In view of the foregoing, it should be appreciated that it would be desirable to provide an electromagnetic radiation structure that uses a deformable truss beam or a flexible membrane and also provide methods and apparatus for measuring and controlling the surface figure of a flexible material to provide a desired surface figure for electromagnetic radiation. Furthermore, additional desirable features will become apparent to one of ordinary skill in the art from the foregoing background of the invention and following summary and detailed description.

BRIEF SUMMARY OF THE INVENTION

In accordance with the present invention, a control system is provided for controlling the shape of a flexible electromagnetic radiation structure. The control system includes a plurality of actuators and a plurality of computational elements. Each of the plurality of actuators is coupled to a portion of the radiation structure and can be selectively actuated by the plurality of computational elements. Thus, the plurality of actuators and the plurality of computational elements provide control of the flexible electromagnetic radiation structure shape.

Each of the plurality of computational elements controls one section of the flexible electromagnetic radiation structure. Thus each of the plurality of computational elements receives controls the one or more of the plurality of actuator within its section. Together, the plurality of computational elements provide a distributed control network for the radiation structure.

The control system thus provides the ability to accurately control and shape a flexible electromagnetic radiation structure. The distributed nature of the control system provides improved performance and fault tolerance. Specifically, because each computational element is controlling only a relatively small section of the structure the shape can be more accurately maintained. Additionally, because each of the plurality of computational elements is at least partially independent, failures in one section of the control system do not necessitate a failure in the entire system.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

In accordance with the present invention, a control system is provided for controlling the shape of a flexible electromagnetic radiation structure. The control system includes a plurality of actuators and a plurality of computational elements. Each of the plurality of actuators is coupled to a portion of the radiation structure and can be selectively actuated by the plurality of computational elements. Thus, the plurality of actuators and the plurality of computational elements provide for shape control of the flexible electromagnetic radiation structure shape.

Figure 1:
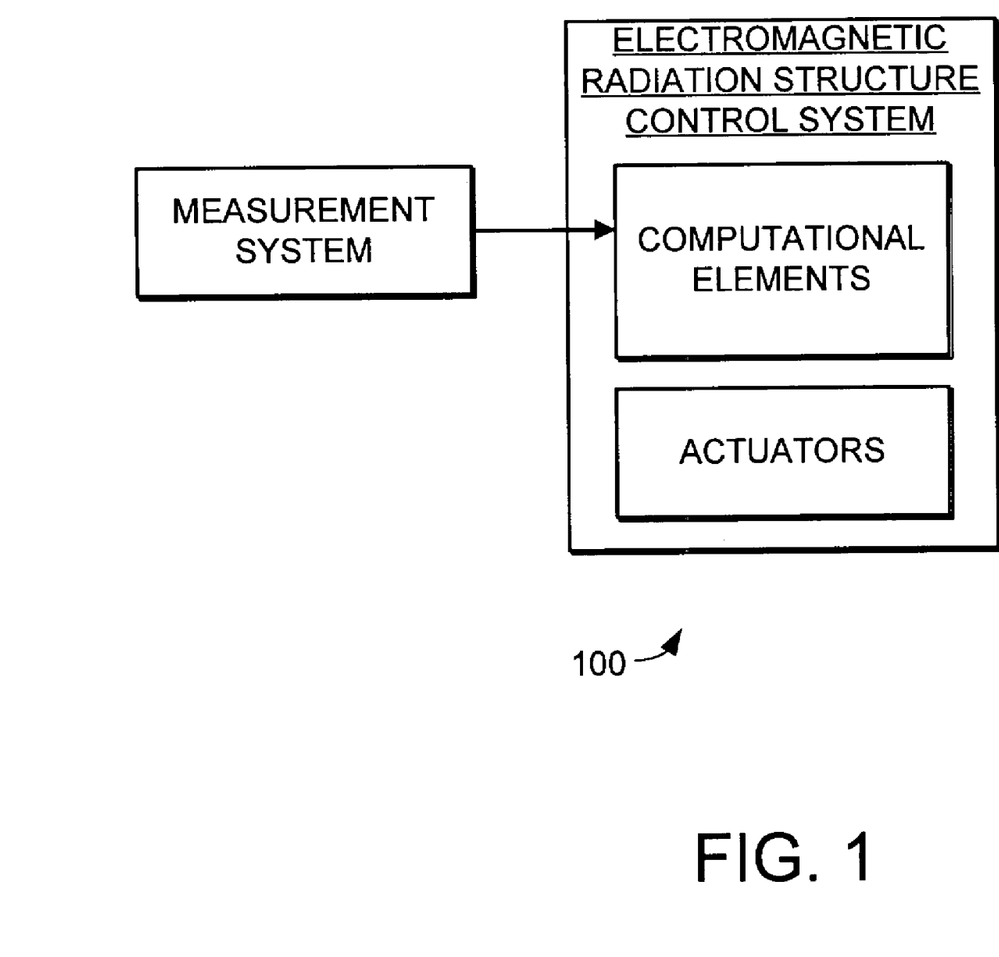
FIG. 1 is a schematic view of a flexible electromagnetic radiation structure control system.

Turning now to FIG. 1, a schematic view of a flexible radiation structure control system is illustrated. The control system includes a plurality of actuators and a plurality of computational elements. The computational elements receive shape data from a measurement system that describes the shape of the flexible electromagnetic structure. In response to that shape data, the computational elements control the actuators to control the shape of the flexible electromagnetic structure. Specifically, each of the plurality of computational elements controls one section of the flexible electromagnetic radiation structure. Thus each of the plurality of computational elements controls the one or more of the plurality of actuator within its section. Together, the computational elements provide a distributed shape control network for the flexible electromagnetic radiation structure.

Typically, the first task of the control system is to initially shape or figure the radiation structure. Once this initial capture of the figure is accomplished, the bandwidth of the surface control depends on the time dependence of the disturbance sources. In some applications, active control of the radiation structure shape is required during use. In these applications, the active control is provided by the control system.

The control system thus provides the ability to accurately control and shape a flexible electromagnetic radiation structure. The distributed nature of the control system provides improved performance and fault tolerance. Specifically, because each computational element is controlling only a relatively small section of the structure the shape can be more accurately maintained. Additionally, because each of the plurality of computational elements is at least partially independent, failures in one section of the control system do not necessitate a failure in the entire system.

The control system can be used on any type of electromagnetic radiation structure that is deformable, comprises a flexible material or structural elements, where the flexible material or structural element might deform to change the structure shape for any type of electromagnetic radiation. Thus, the electromagnetic radiation structure can be any number of electromagnetic radiation structures utilized for reflecting, collecting, receiving, and/or emitting radiation within the electromagnetic spectrum (e.g., Radio Frequency (RF), Ultra-Violet (UV), visible, and Infrared (IR) radiation). For example, the electromagnetic radiation structure can be a space reflector (e.g., a "gossamer" structure), or a phased array radar antenna such as a space-based TDRSS mesh deployed antenna, or telescope, among others. While these descriptions, and the descriptions set forth in U.S. patents incorporated herein by reference, describe specific examples of electromagnetic radiations structures, the present invention includes the specific examples, but is not limited thereto.

As one example, the electromagnetic radiation structure comprises a flexible material that is configured to provide a surface figure (e.g., a surface shape or surface contour) for reflecting electromagnetic radiation. The flexible material can comprise any number of materials or combinations of materials. For example, the flexible material can comprise a generally continuous and non-segmented material. In another embodiment, the flexible material can comprise multiple segments that are each coupled to at least one other segment (i.e., a neighboring segment). In this example, the segments can be coupled to at least one other segment using any number of techniques or the segments can be preferably formed of a unitary sheet or membrane. In a further variation of this example, the flexible electromagnetic radiation structure can comprise on array of rigid members, such as an array of micro-mirrors, with flexible coupling between the members to give the radiation structure shape flexibility.

As described above, the control system includes a plurality of actuators. Each actuator is coupled to the flexible electromagnetic radiation structure and is configured to provide an adjustment of the surface figure based at least upon an actuator set point of the actuator. Any number of actuators can be used in the control system. Typically, the number of actuators in the system would depend on the size and precision requirements of the radiation structure. For example, in a relatively large 50 meter space reflector, the plurality of actuators may include a million or more actuators.

Each of the plurality of actuators can comprise any type of actuator desired to provide an adjustment of the radiation structure shape. For example, a typical electrostatic actuator can be used in accordance with the present invention and U.S. Pat. Nos. 4,825,062 and 4,816,759 can be referred to for additional descriptions of actuators. As a third example, the actuators can comprises Double Diaphragm Pump (DDP) actuators as described in U.S. Pat. No. 6,179,586 and U.S. Pat. No. 5,836,750, which are hereby incorporated by reference. Other examples include any suitable variety of piezo-electric or mechanical actuator. When a plurality of actuators are provided along with a suitable control system, all of these of these actuator types provide the ability to make fine adjustments to shape of the electromagnetic radiation structure shape.

It should be noted that the plurality of actuators can be arrayed in a variety of arrangements, with these arrangements typically depending upon the size, shape and general characteristics of the flexible electromagnetic radiation structure the actuators are employed to shape. For example, the actuators could be arrayed in single row for a "one-dimensional" structure such as a truss beam. In these applications the actuators would typically be distributed along the length of the structure. In a "two-dimensional" application such as a deformable surface, the actuators would typically be arranged in a two dimensional array to best control the shape of the structure. Other applications would require that the actuators be arranged in a three dimensional arrangement to provide full shape control in the three dimensional space.

The control system receives shape data from a measurement system that describes the shape of the flexible electromagnetic structure. The control system uses that shape data to determine how to selectively actuator the plurality of actuators to achieve the desired shape. The measurement system can comprise any suitable type of shape measurement system. As one example, the measurement system can comprise a plurality of local sensors each configured to measure the position or shape of a corresponding piece of the electromagnetic radiation structure. As one example, each of these sensors can be implemented to provide a measurement of the figure error for the radiation structure, where the figure error is a representation of how the shape of the structure at the local sensor differs from the desired shape. These local sensors can comprise any suitable sensor type. For on example a laser profiling sensor can be used to determine shape and position at corresponding locations in the structure. As another example, a wave front sensor (e.g., a Hartmann sensor) can be used in accordance with the present invention and U.S. Pat. No. 4,825,062 and U.S. Pat. No. 4,816,759 can be referred to for additional descriptions of other sensors that are generally suitable for determining the local deformation data.

As another example, the measurement system can comprise a central sensor desired to provide a measurement of all or a substantial part of the radiation structure. A central sensor can provide providing a measurement on the figure error for the electronic radiation structure. Any number of different devices and systems can be used as central sensors. For example, a Twyman-Green interferometer, a Shack-Hartmann sensor or an Electronic Speckle Pattern Interferometer (EPSI) or other laser surface profiling system can be used for measurement of the figure error of the electronic radiation structure.

It should also be noted that the measurement system can comprise a combination of one or more central censors, and a plurality of local sensors. Such a system will be described in greater detail below.

The plurality of computational elements can comprise any suitable combination of computing devices. Each of the plurality of computational elements controls one section of the flexible electromagnetic radiation structure. Thus each of the plurality of computational elements receives controls the one or more of the plurality of actuator within its section. Together, the plurality of computational elements provides a distributed control network for the radiation structure. Each computing element is preferably within the vicinity and more preferably co-located with, or adjacent to the section of the radiation structure that it controls. Additionally, each computing element of each segment is preferably coupled to the computing element of a neighboring section and preferably coupled to multiple neighboring sections-and more preferably coupled to substantially all or all the neighboring section. This provides for communication between computational elements. Thus, the plurality of computing elements can provide control over the entire radiation structure.

Each computational element is preferably configured to receive sensor data and control data relating to its corresponding section and neighboring sections. The sensor data can comprise of data from the local sensors in its section, and from local sensors in neighboring sections. The control data can comprise data on how the actuators have been controlled and set in the corresponding section and neighboring sections of the structure. For example, the figure error from the corresponding and neighboring sections and actuator sets points from the corresponding and neighboring sections can be provided to each computational element. Each computational element can then calculate adjustments to actuator set point(s) within its section to compensate for deformation propagation and other shape errors. Additionally, each computational element can be configured to receive the measurement on the figure error from the at least one central sensor, which is also used in the calculation of the adjustment to the actuator set point(s) within the section.

Because each computational element receives measurement data from its section and neighboring sections, the control system can accurately compensate for shape errors that propagate through multiple segments. More specifically, changes in one section necessarily propagate to neighboring sections, thereby altering the bend or tilt of the neighboring sections. Sharing data between neighboring sections allows the plurality of computational elements to effectively compensate for these changes provide effective real time shape control.

It should be noted that the use of a distributed plurality of computational elements provides several advantages to methods that require centralized computations with access to all measurements and actuator commands. Specifically, the distributed control system does not require the large bandwidth communication network that would be required with some central systems. Instead, sufficient control can be made over by the distributed system using only spatially localized information from near neighbors in the flexible electromagnetic radiation structure.

Figure 2:
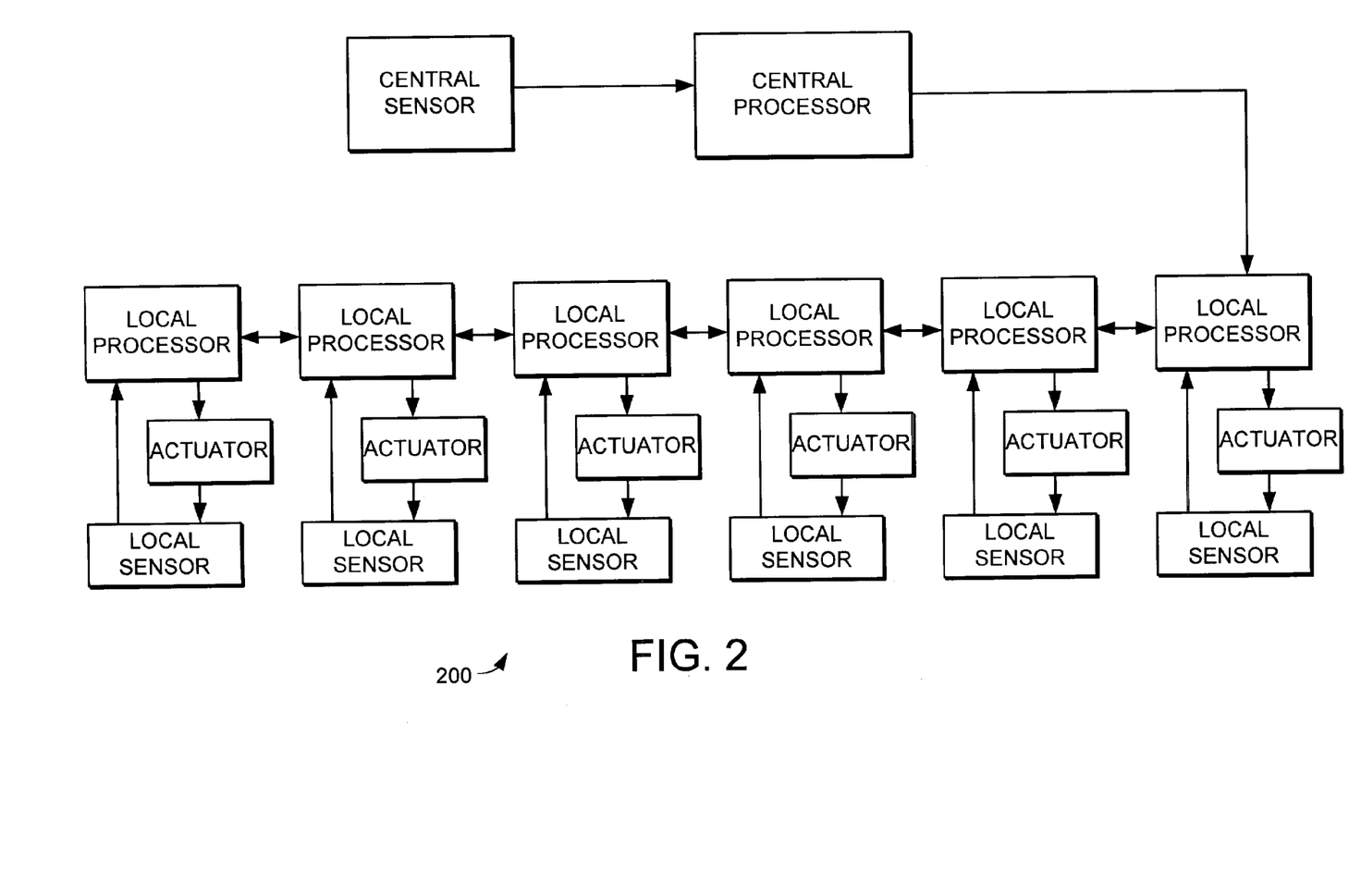
FIG. 2 is a block flexible electromagnetic radiation structure control system.

Turning now to FIG. 2, a more detailed example of a distributed control system 200 will now be given. Control system 200 includes a plurality of local processors, a plurality of actuators, a plurality of local sensors, a central processor, and a central sensor. In this simplified example, each computational element (e.g. local processor) controls one actuator and receives measurement data directly from one local sensor. As described above, this is just one example, and in many cases it may be desirable to control multiple actuators and receive data from multiple sensors each local processor. FIG. 2 shows an example of a linear electromagnetic radiation structure where the actuators make a linear array. Another example might be a structure comprising a surface (e.g. a reflecting surface) where the actuators are distributed over the surface in a regular pattern such as a hexagonal rectangular array. In that the near neighbor communication connection will have a spatial character compared to linear one dimensional character shown in FIG. 2.

The local processors are coupled to each other to provide communication between neighboring processors. These connections between local processors also allow control and sensor data to be sent from the local processor to local processor, and additionally one to the central processor. Thus, the connections between cells can be used by local processors to communicate with the central processor, without requiring additional dedicated transmission buses that would add weight and reduce reliability of the system. Thus, this communication technique allows local processors to communicate with neighbors at relatively high transmission rates, communicate with the central processor at a relatively lower rate, while minimizing system complexity and weight and maximizing fault tolerance.

It should be noted that while the example illustrates only six local processors and six actuators, a typical application would have many more. For example, a large reflecting surface could use millions of actuators, and likewise use millions of relatively simple local processors.

The distributed control system 200 provides the ability to control the shape of a flexible electromagnetic radiation structure. For purposes of this application, the flexible electromagnetic structure will be described as comprising a plurality of "cells", where each cell is a defined as a portion of the electromagnetic radiation structure controlled by an actuator. Dividing the flexible electromagnetic radiation structure into plurality of cells provides a conceptual framework for describing how the control system determines the shape of the structure. Specifically, the concept of cells will be used to describe how the information in the actuator control systems propagates through the radiation structure. As the term is used here, a cell may or may not correspond to any particular physical feature on the flexible structure. The actual physical deformation caused by one actuator can propagate across many cells. When the flexible electromagnetic radiation structure is a continuous non-segment material, the cells could comprise any defined shape pattern or method of dividing the structure into smaller portions. As another example, when the flexible electromagnetic radiation structure is comprised of multiple segments, it may be desirable to define each segment as a cell, although this may not always be the case. Cells may comprise any suitable shape and size, including geometric shapes such as hexagons, triangles, squares. Cells can be patterned in any suitable regular arrangement, including triangular, rectangular, and hexagonal grid.

Furthermore, as described above, each local processor controls the operation of one or more actuators in a section of the radiation structure. It is important to note that the sections controlled by each processor can comprise one or more cells. For example, a processor may control three actuators and thus be considered to control three cells of the structure. In the example of FIG. 2, each processor controls one actuator and thus each section comprises one cell.

Figure 3:
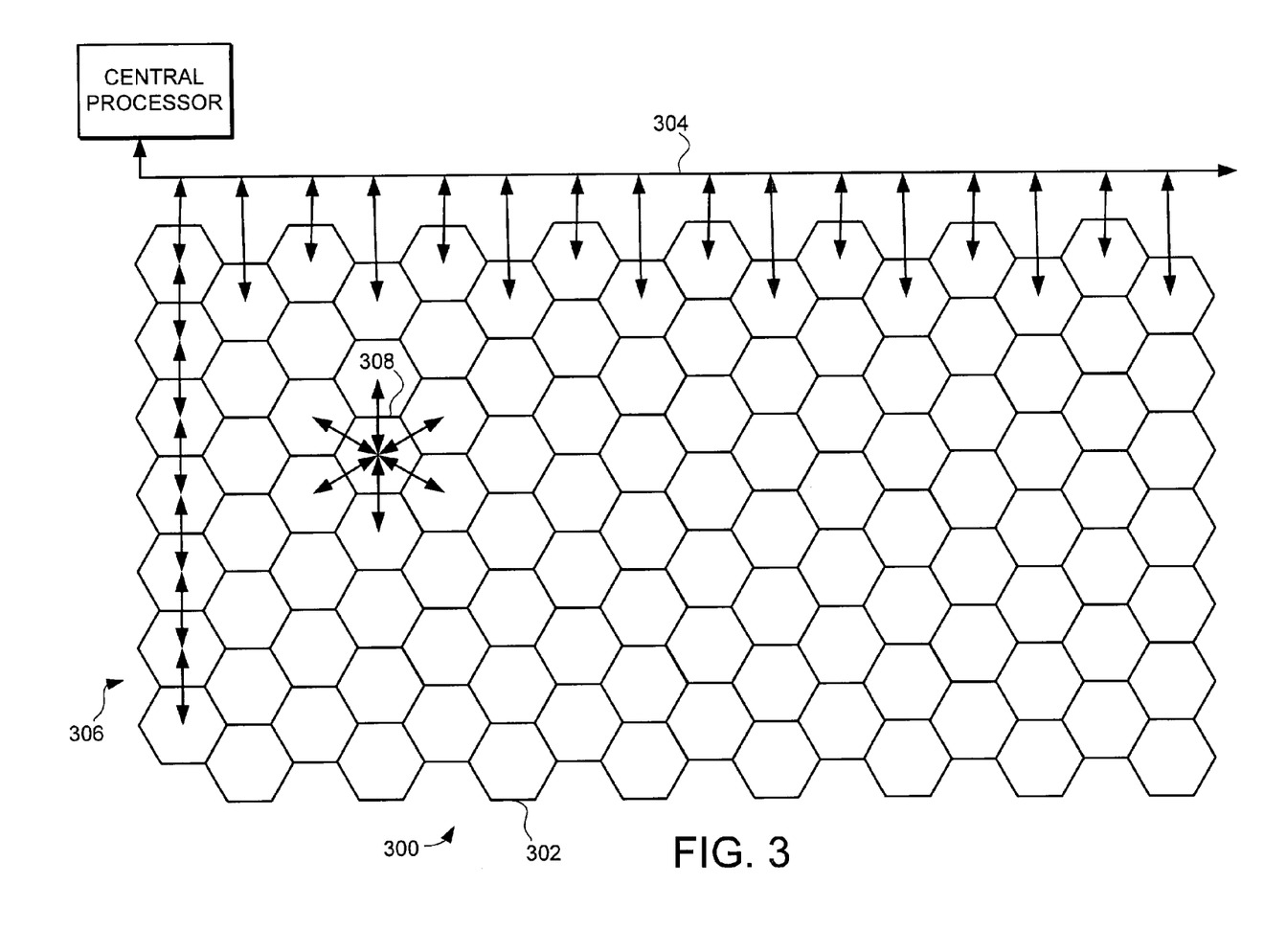
FIGS. 3–5 are schematic views of a portion of a flexible electromagnetic radiation structure.

Turning now to FIG. 3, a portion 300 of an exemplary flexible electromagnetic radiation structure is illustrated. The portion 300 includes a plurality of cells 302. In the example of a FIG. 3, the cells comprise hexagonal portions of the structure. Again, these cells may or may not correspond to any physical features on the structure. Not explicitly illustrated in FIG. 3 are the local processors and actuators for each cell that would commonly be collocated within the each cell, and the connection buses between each cell. Also not explicitly illustrated are any local or central sensors that would typically be included.

In this example it will again be assumed that each cell includes one local processor, one actuator, and one local sensor, although again this is one example of a possible configuration.

Each of the cells in the array is coupled to its neighboring cells. As an example, the communication paths between cell 308 and each of its neighboring cells are illustrated in FIG. 3. The connections between cells facilitate communication between the local processors of each cell and the local processors its neighboring cells. This allows local processors to use sensor data and control data from the neighboring cells in determining how to control their respective actuators. Cells at the edge of the portion 300 are connected to a bus 304. Bus 304 allows the local processors in each of the cells to communicate with the central processor by passing data from cell to cell until the bus 304 is reach. As an example, the column of cells 306 is shown illustrating how a string of cells can be used to pass data from a local processor at the interior of the structure out to the bus 304 and finally to the central processor, and vice versa. This allows the local processors of to use data from the central processor when determining how to control their respective actuators, although this data is provided and used at a lower rate than local and neighboring data. Again, each local processor can communicate with the central processor even though only a portion of the cells are actually directly connected to the bus 304.

Figure 4:
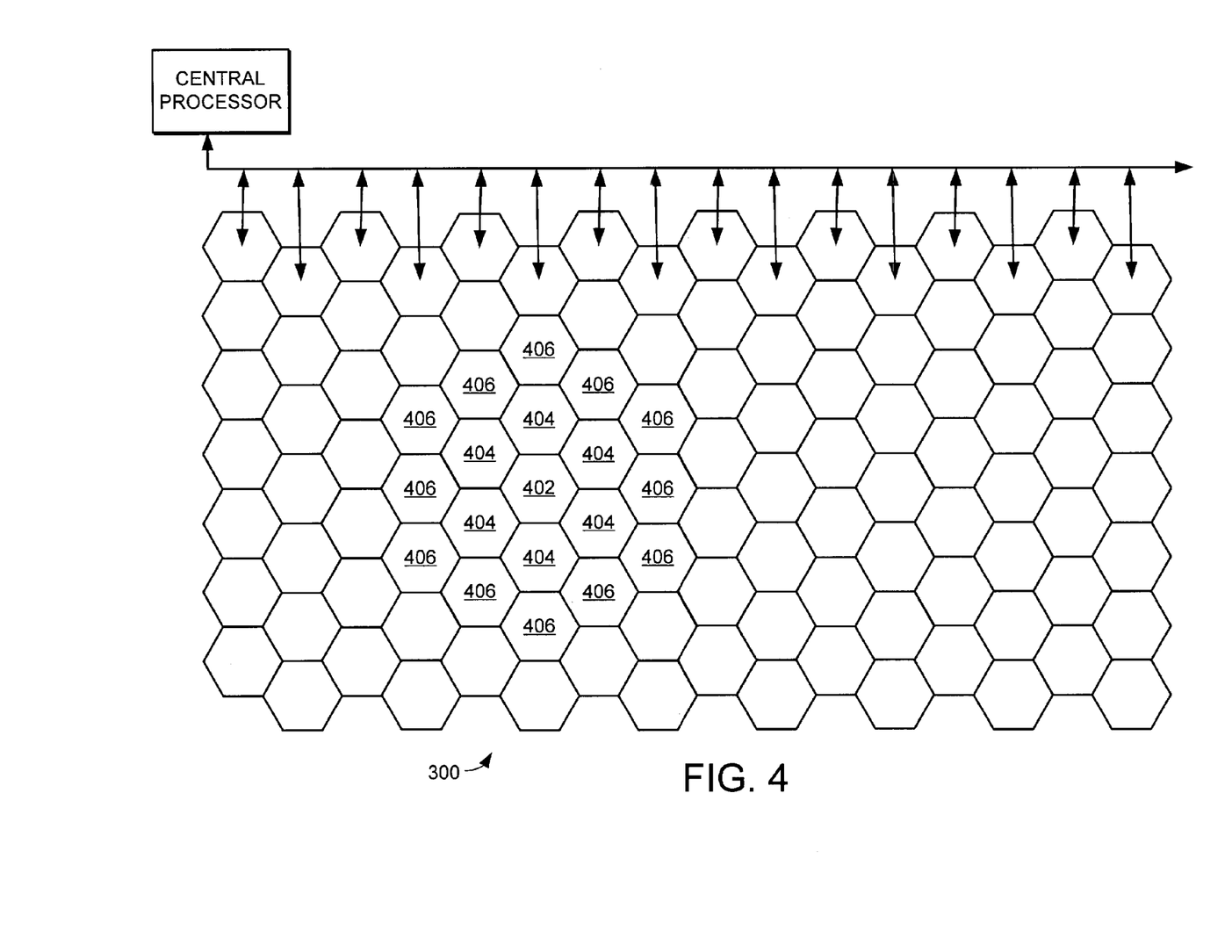

In addition to using data from immediate neighbors, the control system allows local processors to use actuator and control data from more remote neighbors in determining how to control its actuator. Turning now to FIG. 4, the flexible electromagnetic radiation structure 300 is illustrating showing that an exemplary cell 402 has a plurality of immediate neighboring cells 404. The cell 402 also has once-removed neighboring cells 406, and so on. In determining control of an actuator in cell 402, the local processor can use sensor and control data from the immediately (first) neighboring cells 404, once removed (second) neighboring cells 406 and so one. As all cells in the structure include similar connections to neighbors, they can also use sensor and control data from the neighbors in determining how to control their respective actuators. It should be noted that it will generally be desirable to weight any sensor and control data from the neighbors according to how close those neighbors are to the cell. This allows data from more relevant neighbors to be given greater weight then less relevant neighbors. This allows information from these cells is used most effectively in determining how to control the actuator in their respective cell.

Figure 5:
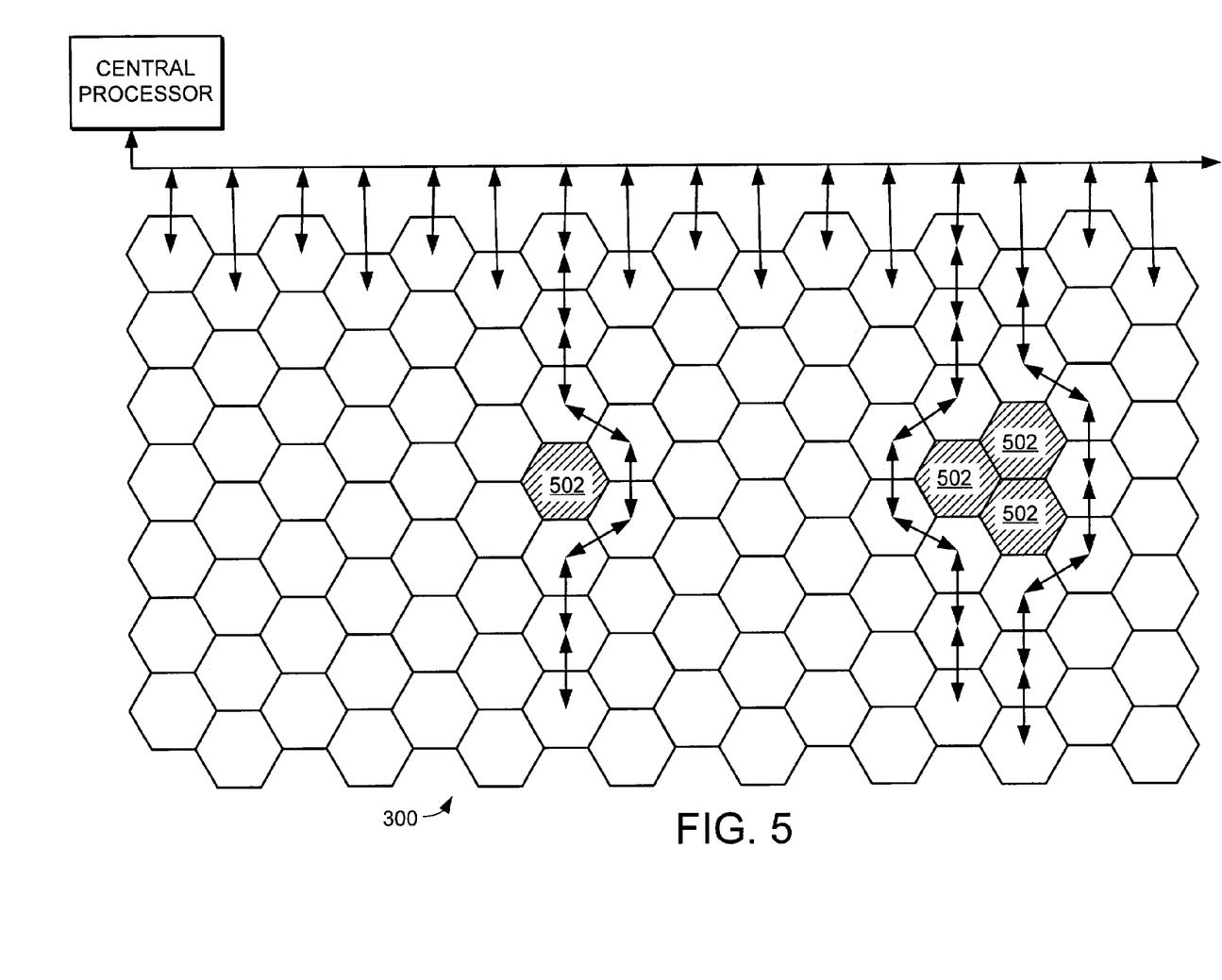

The distributed nature of the control system provides for improved fault tolerance and the ability to compensate for failures in individual cells. Turning now to FIG. 5, the flexible electromagnetic radiation structure portion 300 is illustrated showing several exemplary failed cells 502. These cells could fail for a variety of reasons, including problems with the local processor, actuator, or connections between cells. When failure in a cell occurs, it necessarily affects the ability of the system to control the associated cell. However, the multiple connections between cells and neighbors can be used to minimize the effects of that failure. Specifically, by utilizing different connections between neighboring cells, communication paths between all the remaining good cells and the central processor can be maintained. FIG. 5 illustrates three examples of modified communication paths that bypass the failed cells 502 and provide communication to the remaining cells. It should also be noted that failure of cells 502 may affect the ability of neighboring cells to get sensor and control data from that cell. It is thus desirable to configure the local processors to compensate for the loss of sensor and control data from failed cells to maintain effective control, to the extent that this is possible.

In general, the control system thus provides the ability to accurately and reliably control the shape of a flexible electromagnetic radiation structure. The plurality of local processors receives shape data and selectively controls the plurality of actuators to maintain the desired shape of the structure. A detailed example of some of the elements and techniques that can be used to implement such a control system will now be discussed. Again, for simplicity purposes, each local processor will be assumed to control one actuator and thus one cell. Furthermore, each local processor will receive shape data corresponding to its cell from a local sensor. The plurality of local processors will also be assumed to receive mapped central sensor data from a central sensor. Again, all of these details are just examples of how the control system can be implemented.

As stated above, in this example each local processor controls one actuator and thus one cell of the radiation structure. Each local processor is preferably within the vicinity and more preferably co-located within its corresponding cell. Each local processor is coupled to the local processors for neighboring cells. Each local processor receives local sensor data from its corresponding sensor and from the neighboring sensors. This data can include the figure error for itself and each of the neighboring cells. This figure error represents the difference between the desired shape value and the actual shape value. Additionally, each local processor receives the actuator set point for each of the neighboring segments.

From this shape and control data, each local processor can calculate an adjustment to the actuator set point for its cell to compensate and eliminate deformation propagation. Additionally, each local processor is configured to receive the measurement on the figure error from the central sensor, which is also used in the calculation of the adjustment to the actuator set point for compensation of the deformation propagation.

More specifically, since the cells are in fact part of a coupled beam, or a single beam, coupled membrane, a single membrane or single film, the bending of one cell propagates to neighboring segments, thereby altering the bend or tilt of the neighboring segment. With an appropriate computation of the actuator action, the distribution can be altered to compensate for figure errors (e.g., tilt errors) in the segments forming the flexible material. This computation can be accomplished using an actuator influence function, which can be assumed to have the same shape irrespective of the segment position in the flexible membrane. The computation can also be further approximated with a representation in the form of a localized update of the actuator set points of the actuators. The computation is preferably applied in an iterative manner until the figure error is reduced to a desirable level. The interaction between actuators might exist even in the cases when each segment is a rigid segment independently controlled by its own actuators. In that case, the interaction (cross-coupling) might be caused by the error measurement system, such as an wavefront error measurement system. The wavefront measurement in the vicinity of a segment including neighbor segment measurements would be influenced by moving actuators for the segment.

The resulting distributed iterative update of the actuator set points based upon the figure error distribution (e.g., tilt error distribution) represents a distributed closed-loop control system and can therefore be analyzed as such a system. One example of such a form is:

$$U(j;t+1)=U(j;t)+KV(j,t)+SU(j,t) \quad (1)$$

where:

$$V(j;t)=c(z)e(j;t)) \quad (2)$$

and where $U(j;t)$ is a vector of the actuator set points the actuators in the segment j at time sample t, $U(j,t)$ is a vector of the actuator set points for the given cell and the neighboring cells up to the n-th neighbor, $e(j;t)$ is a vector of the figure errors for the given segment and the neighboring segments up to the n-th neighbor, $V(j;t)$ is an auxiliary vector of the same size as $U(j;t)$, K and S are matrices of appropriate dimensions used to weigh sensor and control data, and $c(z)$ is a dynamic transfer function of a feedback controller, such as a PI controller with z being a discrete Laplace variable. Therefore, equation (1) can be expressed as $$U(j;t+1)=U(j;t)+Ke(j,t) \quad (3)$$

This control system thus determines the control of each actuator based on a weighted sum of past control and sensor measurement errors for it and several neighboring cells. These distributed localized control calculations are relatively straightforward and can be computed in real time in relatively simple local processor hardware.

The controller for the system described in equations (1) and (2) can be designed using a designed using a loopshaping technique similar to one discussed in "Design of a practical robust controller for a sampled distributed parameter system,", by Stewart, G., Gorinevsky, D., and Dumont, G., 37th IEEE Conf. on Decision and Control, Tampa, Fla., December 1998.

Figure 6:
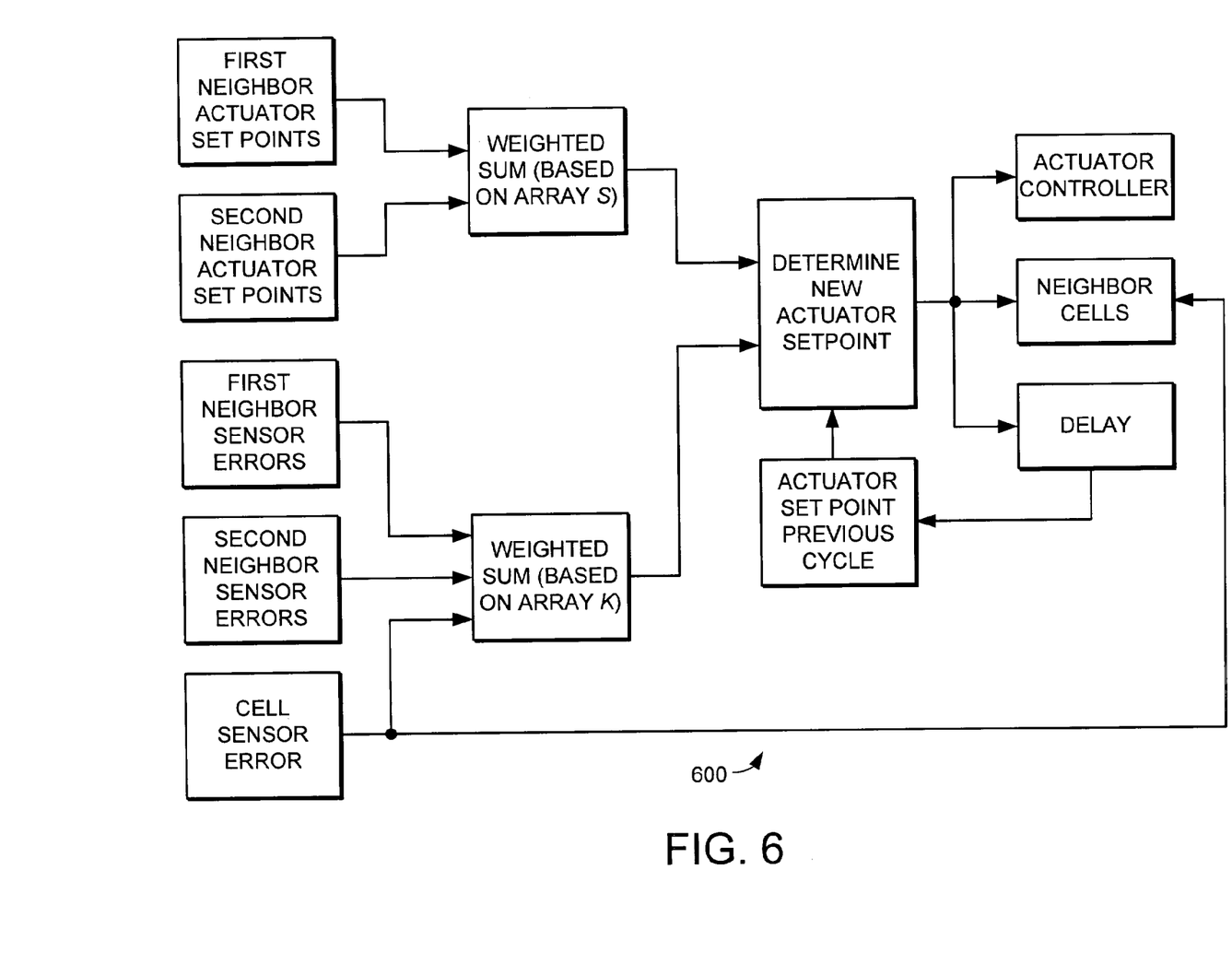
FIG. 6 is a block diagram view of an actuator control algorithm.

Turning now to FIG. 6, a block diagram 600 illustrates one example of how a local processor can selectively control an actuator in the corresponding cell based on control data and sensor data with an implementation based on equations (1), (2) and (3). In this example, control data and sensor data from neighboring cells are added into a weighted sum. The results of these weighted sums, and control data for the actuator from the previous cycle are then used to determine the new control parameter for the actuator.

In this example, the control data comprises the actuator set points for the actuators, i.e., a value indicative of the displacement setting of the actuator. Also in this example, the sensor data comprises sensor error, i.e., a value indicative of the amount of error between the current position of the cell and the desired position. Of course, these are just examples of the type of control data and sensor data that can be used. Other examples of sensor data are parameters of the reflecting surface tilt within the cell or wavefront error for the cell of a combination of these. The control parameters could also be actuator voltage, force, torque or otherwise defined command variables.

In this example, the actuator set points and sensor errors are used from the corresponding cells, first neighbor cells, and second neighbor cells. The corresponding cell is again, the cell for which the actuator set point is being calculated, the first neighbors are generally the cells within a defined area of the corresponding cell, and the second neighbors are cells within a farther defined area. Returning briefly to FIG. 4, an example of this classification was shown with cell 402 as an exemplary corresponding cell, cells 404 as exemplary first neighbor cells, and cells 406 as exemplary second neighbor cells. It should be noted that in addition to the first neighbor cells, and second neighbor cells, sensor and control data can be used from further neighboring cells, such as third, fourth and fifth removed neighbor cells.

Returning to FIG. 6, according to equation (1), the actuator set points from the first neighbor cells and the second neighbor cells are added as a weighted sum based on array S. Specifically, array S provides the smoothing values that are used to weigh the actuator set points to account differences in distance and direction to the corresponding cell and how that affects the relevance of those actuator set points. An exemplary array S (for a one dimensional linear array of actuators, using first, second and third neighbors) is as follows:

$$S=[0.1148 \; 0.1636 \; -0.3336 \; 0.6196 \; -0.3336 \; 0.1636 \\ 0.1148] \quad (4)$$

It should be noted that in this array the end values (0.1148) are used to weigh the third neighbors, the next in values (0.1636) are for the second neighbors, the next in values (−0.3336) are for the first neighbors, and the center value is for the corresponding cell. Such a matrix would be expanded in terms for two and three dimensional arrays of actuators.

Likewise, from equation (1) the cell sensor error from the corresponding cell, the first neighbor cells, and the second neighbor cells are added as a weighted sum based on array K. Specifically, array K provides the feedback gain values that are used to weigh the sensor error data to account for differences in distance to the corresponding cell and how that affects the relevance of the sensor error data. An exemplary array K (for a one dimensional linear array of sensors using first, second and third neighbors) is a as follows:

$$K=[0.0972\ -0.3110\ 1.4595\ 0\ -1.4595\ 0.3110\ -0.0972] \quad (5)$$

Again, in this array the end values (±0.0972) are used to weigh the third neighbors, the next in values (±0.3110) are for the second neighbors, the next in values (±1.4595) are for the first neighbors, and the center value (0) is for the corresponding cell. The matrix K is anti-symmetric with respect to its center to account for the fact that tilts caused by an actuator have opposite slopes on different sides of the actuator resulting in spatially anti-symmetric deformation response and requiring an anti-symmetric feedback gains. Again, the matrix would typically be expanded for applications with two or three dimensional arrays of sensors.

The weighted sum of actuator set points, weighted sum of sensor errors, and actuator set points from the previous cycle are then added to determine the actuator set point for the next cycle. This implements equation (1) above, and thus the new actuator set point is determined passed on the specified parameters. That new actuator set point is passed to the actuator controller, thus setting the actuator set point for the next cycle. The new actuator set point is also sent to a delay that stores the actuator set point for use in the next cycle to determine the next set point. Finally, the actuator set point, along with the cell sensor error, is passed to neighboring cells where it can likewise be used to determine actuator set points for those cells.

As described above, any suitable type of measurement system can be used to provide shape data to the control system. As two examples, the measurement system can comprise only a plurality of local sensors, or only a central sensor. As a third example, the measurement system can comprise both a plurality of local sensors and a central sensor. In this example, the central sensor can be used to determine offset values for each of the plurality of local sensors. This assures that each of the local sensors is measuring shape data from an appropriate baseline. Such a system will not be described in more detail.

As described above, the central sensor measures the overall shape of the electromagnetic radiation structure using any of a variety of methods. The central sensor data is then mapped to association the central sensor data with the appropriate corresponding cells. That portion corresponding to the each individual cell can then be sent to the local processor through the network of cells. Because of the time required to map the central sensor data and send it through the network to the local sensors, the mapped central sensor data is typically received at the local processor at a much lower rate than the local sensor data. For example, the mapped central data may only be received at the local process once each second, while in contrast, the local and neighbor sensor data can be provided to the local processor multiple times per second.

Although updated at a lower rate, the mapped central sensor data can provide information that is not readily available from the local and neighboring sensors. For example, it can provide a measurement of overall shape of the structure. Additionally, in some circumstances the central sensor can provide more accurate measurements of the structure shape. Thus the central sensor can be used to account for shape distortions caused by thermal drift, and determine errors that occur during initial deployment.

Figure 7:
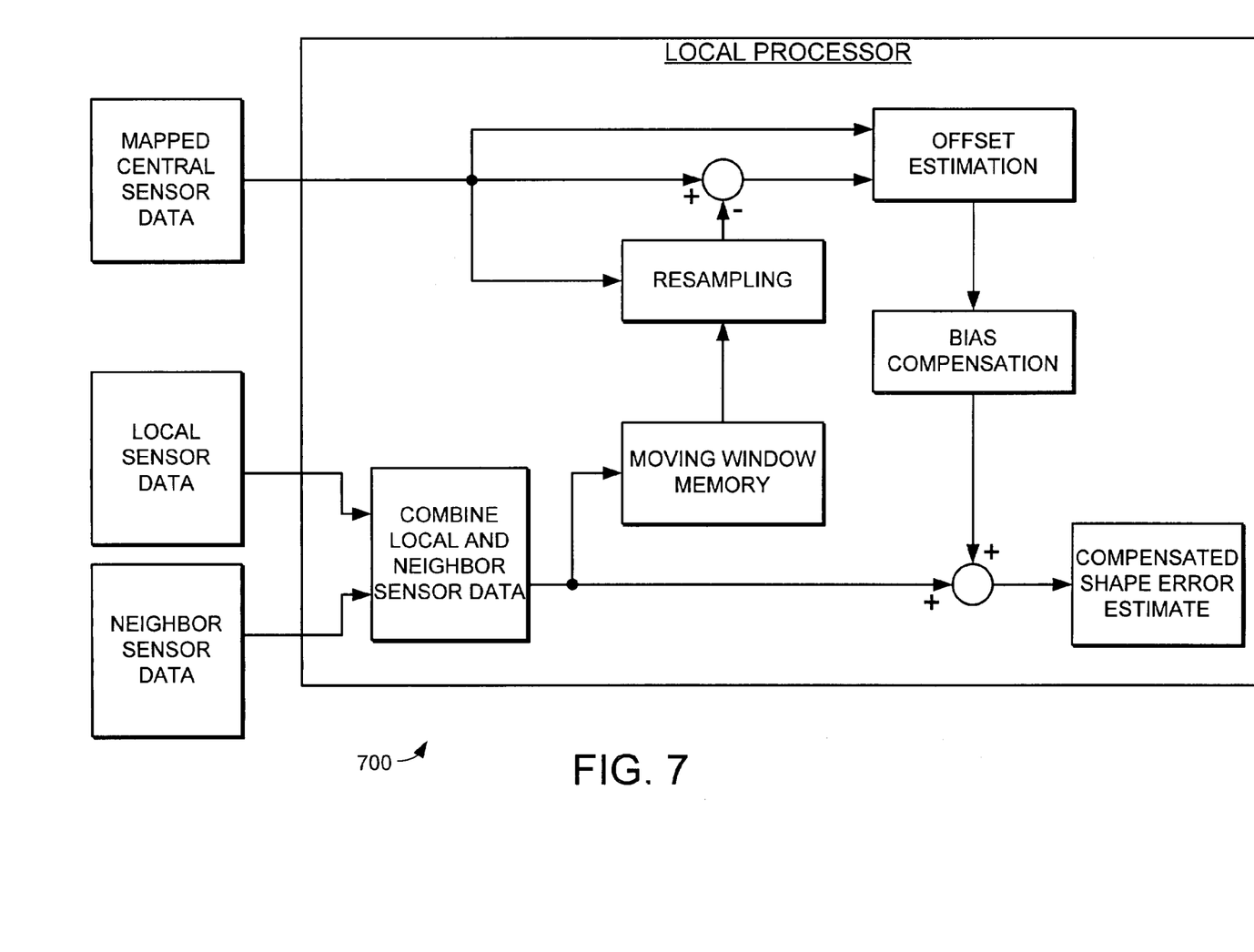
FIG. 7 is a block diagram view of a local processor implementation.

As stated above, the local processors can use a combination of data from the local sensor, local processor, the processors and sensors of neighboring cells, and data from a central sensor to determine how to control associated actuators. The system combines the accuracy and overall measurements provided by the central sensor with the high resolution, high rate measurements provided by the array of local sensors. Turning now to FIG. 7, a schematic diagram 700 showing an exemplary way of combining data from these disparate sources and generating a shape error estimate is illustrated is illustrated. This operation would be performed by each local processor in controlling their respective actuators. In this example, each local processor receives mapped central sensor data from the central sensor and local sensor from the sensor in the corresponding cell and neighbor sensor data from the sensor in neighboring cells. The combination of data allows the use of disparate sources of information to most accurately determine the control needs of the system.

In this one example, the central sensor data is used to calibrate the offset of the local sensors. Thus, the central sensor data is used to assure that all of the local sensors are measuring from an appropriate baseline. Using central sensor data to periodically update the offset of each local sensor provides the ability to compensate for drifts in the offset caused by changes in operational environment such as temperature changes.

The local processor also receives sensor data from the local sensor and local sensors in neighboring cells. The data from the local and neighboring cells is combined using any suitable combination procedure. For example, the local and neighboring sensor data can be combined using a weighted linear combination technique that gives more weight to the local sensor and close neighbor sensors then it does to more remote sensors.

The local and neighbor sensor data combination is passed to a moving memory window that provides temporary storage of the data. Specifically, the moving window memory stores the local and neighbor sensing data from a set previous time period, such as the previous ten seconds of time. The data is stored to allow the mapped central sensor data to be combined with local data from the same time period. Again, because the mapped central sensor data is passed through the network to reach the local processor, there is some delay before it arrives at the local processor. The moving memory window stores local data from previous time periods to allow the mapped central data to be combined and compared with local data from the same time. The moving window memory passes the local data to the resampling block as needed.

The resampling block can be implemented as software, hardware and/or firmware. The resampling block resamples the data from the moving window memory to facilitate combination with the mapped central sensor data. This resampling can include the ability to interpolate data to provide for correct time combinations. For example, if local sensor data is available from eight seconds ago and from ten seconds ago, but the central sensor data is available only for nine seconds ago, the resampling element can interpolate old values collected at eight and ten seconds to generate data that can be compared against and combined with the nine second old central sensor data. Thus, resampling can be used to facilitate the combination of local and central sensor data from the same time instance. This is desirable because changes in shape would otherwise make accurate comparisons impossible.

The resampled local data is then subtracted from the mapped central sensor data from the same time period. That subtracted data is sent to the offset estimation element. The offset estimation element estimates the difference between the local sensor data and the central sensor data. The offset estimation is used to adjust the offsets of the local sensor. Using central sensor data to periodically update the offset of each local sensor provides the ability to compensate for drifts in the offset caused by changes in operational environment.

One type of suitable mechanism that can be used for offset estimation is a Kalman filter. Kalman filters are processing tools that can be used to combine or fuse in an optimal way different types of data from different sources describing the same system. As such, the Kalman filter can be used to compensate the offset of the local sensor based on sensor data from the central sensor.

As stated above, the offset estimation determines how the offset of the local sensor is compared to a baseline determined by the central sensor. From this offset estimation, it can be determined by the bias compensation element how much the local sensor data measurements need to be adjusted to compensate for changes in the operational environment. This bias compensation value is then added to the local and neighbor sensor data to provide a compensated shape error estimate. That shape error estimate is then used to control the operation of the corresponding local actuators. Specifically, the compensated shape error estimate can be used as cell sensor error data in the system illustrated in FIG. 6 to determine a new actuator set point.

By periodically applying the compensation system illustrated in FIG. 7 to all the local sensors in all of the cells, the offset of each local sensor can be set to an appropriate baseline. Thus, the accuracy and reliability of the local sensor system is improved and drift in local sensor data is reduced or eliminated. When the local sensor data is used as a shape error estimate in determining actuator set points, the offset calibration ensures that the actuator set points are determined from an appropriate baseline.

Again, it should be noted that this is just one example of a measurement system that can be used to provide shape data. As alternative examples, the measurement system can comprise only a plurality of local sensors, or only a central sensor. Furthermore, this is only one example of how local sensor data and central sensor data can be combined to provide shape data to the control system.

Thus control system thus provides ability to effectively control the shape of a flexible electromagnetic radiation structure. The control system includes a plurality of actuators and a plurality of computational elements. Each of the plurality of actuators is coupled to a portion of the radiation structure and can be selectively actuated by the plurality of computational elements. Thus, the plurality of actuators and the plurality of computational elements provide control of the flexible electromagnetic radiation structure shape. Each of the plurality of computational elements controls one section of the flexible electromagnetic radiation structure. Thus each of the plurality of computational elements receives controls the one or more of the plurality of actuator within its section. Together, the plurality of computational elements provide a distributed control network for the radiation structure.

From the foregoing description, it should be appreciated that an electromagnetic radiation structure and methods and apparatus for controlling and/or measuring the surface figure of a flexible material of an electromagnetic radiation structure are provided in accordance with the present invention that present significant benefits that would be apparent to one or ordinary skill in the art. Furthermore, while a preferred exemplary embodiment has been presented in the foregoing detailed description, it should be appreciated that a vast number of variations in the embodiments exist, including, but not limited to an electromagnetic radiation structure formed of separate rigid segments, such as a 2-D array of MEMS micro-mirrors. Lastly, it should be appreciated that these embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. It being understood that various changes may be made in the function and arrangement of elements described in this detailed description of the drawings without departing from the spirit and scope of the invention.

What is claimed is:

1. A control system for controlling a shape of a flexible electromagnetic radiation structure, the control system comprising:
    a plurality of actuators, each of the plurality of actuators coupled to a portion of the flexible electromagnetic radiation structure to selectively actuate the coupled portion of the flexible electromagnetic radiation structure;
    a plurality of computational elements, each of the plurality of computational elements corresponding to a section of the flexible electromagnetic radiation structure and selectively controlling at least one of the plurality of actuators to control the shape of the corresponding section of the flexible electromagnetic radiation structure.

2. The control system of claim 1 wherein each of the plurality of computational elements is adjacent to the corresponding section of the flexible electromagnetic radiation structure.

3. The control system of claim 1 wherein each of the plurality of computational elements is coupled to neighboring computational elements to facilitate data transmission from one computational element to another computational element.

4. The control system of claim 1 wherein each of the plurality of computational elements receives control data from computational elements corresponding to neighboring sections.

5. The control system of claim 4 wherein the control data comprises actuator set points.

6. The control system of claim 1 wherein each of the plurality of computational elements receives sensor data from computational elements corresponding to neighboring sections.

7. The control system of claim 6 wherein the sensor data comprises cell sensor error indicating a difference between a current position and a desired position.

8. The control system of claim 1 wherein each of the plurality of computational elements utilizes weighted sensor data and weighted control data from neighboring computational elements to selectively control at least one of the plurality of actuators.

9. The control system of claim 8 wherein each of the plurality of computational elements further utilizes control data from a previous cycle to selectively control at least one of the plurality of actuators.

10. The control system of claim 1 wherein the plurality of actuators are arrayed in a one dimensional array arrangement.

11. The control system of claim 1 wherein the plurality of actuators are arrayed in a two dimensional array arrangement.

12. The control system of claim 1 further comprising a measurement system, the measurement system configured to provide shape data to the plurality of computational elements.

13. The control system of claim 12 wherein the measurement system comprises a plurality of sensors, each of the plurality of a plurality of sensors configured to provide local sensor data for a corresponding portion of the flexible electromagnetic radiation structure and passing the shape data to a corresponding computational element.

14. The control system of claim 13 wherein the measurement system further comprises a central sensor, the central sensor measuring at least part dan overall shape of the flexible electromagnetic radiation structure and passing mapped shape data to each of the plurality of computational elements.

15. The control system of claim 14 wherein each of the plurality of computational elements includes an offset estimation element to estimate an offset of the local sensor data based on the mapped shape data.

16. The control system of claim 15 wherein the offset estimation element comprises a Kalman filter.

17. A control system for controlling a shape of a flexible electromagnetic radiation structure, the control system comprising:
a plurality of actuators, each of the plurality of actuators coupled to a portion of the flexible electromagnetic radiation structure to selectively actuate the coupled portion of the flexible electromagnetic radiation structure;
a plurality of sensing elements, each of the plurality of sensing elements configured to provide local sensor data for a corresponding portion of the flexible electromagnetic radiation structure;
a plurality of computational elements, each of the plurality of computational elements corresponding to a section of the flexible electromagnetic radiation structure, each of the plurality of computational elements coupled to at least one other of the plurality of computational elements to facilitate communication between computational elements, each of the plurality of computational elements coupled to and receiving the local sensor data from at least one of the plurality of sensing elements and selectively controlling at least one of the plurality of actuators to control the shape of the corresponding section of the flexible electromagnetic radiation structure.

18. The control system of claim 17 wherein each of the plurality of computational elements is adjacent to the corresponding section the flexible electromagnetic radiation structure.

19. The control system claim 17 wherein each of the plurality of computational elements receives control data and local sensor data from at least one computational elements corresponding to a neighboring section, and wherein each of the plurality of computational elements weighs the control data and the local sensor data from the at least one of the computational elements corresponding to a neighboring section and utilizes the weighted control data and the weighted local sensor data to selectively control at least one of the plurality of actuators.

20. The control system of claim 19 wherein each of the plurality of computational elements further utilizes control data from a previous cycle to selectively control at least one of the plurality of actuators.

21. The control system of claim 20 wherein the control data comprises actuator set points and the local sensor data comprises cell sensor error data.

22. The control system of claim 17 further comprising a central sensor, the central sensor measuring a shape of the flexible electromagnetic radiation structure and passing mapped shape data to each of the plurality of computational elements, and wherein each of the plurality of computational elements includes a Kalman filter to estimate an offset of the local sensor data based on the mapped shape data.

23. An electromagnetic radiation structure, comprising:
a flexible material that is configured to provide a surface figure for electromagnetic radiation, said flexible material having a plurality of sections that are each coupled to at least one other sections such that adjustment of said surface figure within one of said plurality of sections results in deformation propagation of said surface figure within at least one other section;
at least one actuator coupled to each of said plurality of section, said actuator configured to provide an adjustment of said surface figure within one of said plurality of sections;
a sensing implement associated with each of said plurality of sections, said sensor configured to determine an error of the surface figure with one of said plurality of sections; and
a computational element for each of said plurality of sections, said computational element configured to receive said error from said plurality of sections, configured to receive an actuator set point for said sensing element and said at least one actuator, configured to receive an actuator set point for at least one neighboring section, and configured to calculate an adjustment to said actuator set point for compensation of said deformation propagation.

24. The electromagnetic radiation structure of claim 23 further comprising a central sensor configured to provide a figure error to a central computational element.

* * * * *

UNITED STATES PATENT AND TRADEMARK OFFICE
CERTIFICATE OF CORRECTION

PATENT NO. : 7,012,271 B2 Page 1 of 1
APPLICATION NO. : 10/401651
DATED : March 14, 2006
INVENTOR(S) : Dimitry Gorinevsky et al.

It is certified that error appears in the above-identified patent and that said Letters Patent is hereby corrected as shown below:

Column 15, line 16, "part" should be changed to --of an--.

Signed and Sealed this

Thirteenth Day of May, 2008

JON W. DUDAS
*Director of the United States Patent and Trademark Office*